(12) United States Patent
Green et al.

(10) Patent No.: US 8,906,437 B2
(45) Date of Patent: Dec. 9, 2014

(54) EDIBLE CONTAINER FOR FOODSTUFFS AND PROCESS FOR PRODUCING THE SAME

(71) Applicant: Nestec S.A., Vevey (CH)

(72) Inventors: John Green, Le Mont St. Adrien (FR); Wolfgang Gaeng, Le Mont St. Adrien (FR)

(73) Assignee: Nestec S.A., Vevey (CH)

( * ) Notice: Subject to any disclaimer, the term of this patent is extended or adjusted under 35 U.S.C. 154(b) by 0 days.

(21) Appl. No.: 13/848,475

(22) Filed: Mar. 21, 2013

(65) Prior Publication Data

US 2013/0216660 A1 Aug. 22, 2013

Related U.S. Application Data

(63) Continuation of application No. 11/720,254, filed as application No. PCT/EP2005/010911 on Oct. 11, 2005, now abandoned.

(30) Foreign Application Priority Data

Nov. 26, 2004 (EP) .................................... 04028070
Mar. 23, 2005 (EP) .................................... 05102346

(51) Int. Cl.
*A21D 13/00* (2006.01)
*A21D 2/36* (2006.01)
*A23G 9/48* (2006.01)
*A23G 9/50* (2006.01)

(52) U.S. Cl.
CPC .............. *A21D 13/009* (2013.01); *A21D 2/36* (2013.01); *A21D 2/364* (2013.01); *A21D 13/0009* (2013.01); *A21D 13/0029* (2013.01); *A23G 9/48* (2013.01); *A23G 9/506* (2013.01)
USPC .............. 426/94; 426/138; 426/302; 426/391

(58) Field of Classification Search
CPC ......... A21D 2/36; A21D 2/364; A21D 13/00; A21D 13/026; A23G 3/2092
USPC .................................................... 426/94, 302
See application file for complete search history.

(56) References Cited

U.S. PATENT DOCUMENTS

| | | | | |
|---|---|---|---|---|
| 1,637,556 A | * | 8/1927 | Denaro | 426/139 |
| 2,167,353 A | | 7/1939 | Frediani | |
| 3,648,649 A | * | 3/1972 | Wasserman | 118/31 |
| 4,275,647 A | * | 6/1981 | Chambers et al. | 99/339 |
| 4,505,220 A | * | 3/1985 | Bank et al. | 118/16 |
| 4,603,051 A | | 7/1986 | Rubenstein et al. | |
| 4,629,628 A | | 12/1986 | Negro et al. | |
| 4,927,656 A | * | 5/1990 | Ito | 426/549 |
| 5,336,511 A | | 8/1994 | Der Beek et al. | |
| 5,783,126 A | * | 7/1998 | Andersen et al. | 264/102 |
| 6,103,279 A | * | 8/2000 | Ferrero | 426/94 |
| 2001/0043970 A1 | | 11/2001 | Conti et al. | |

FOREIGN PATENT DOCUMENTS

| | | |
|---|---|---|
| EP | 0288120 | 10/1988 |
| EP | 0867117 | 9/1998 |
| EP | 0929226 | 7/1999 |
| EP | 0967881 | 1/2000 |
| JP | 60 083526 | 5/1985 |
| WO | 9707682 | 3/1997 |

* cited by examiner

*Primary Examiner* — Humera Sheikh
*Assistant Examiner* — Bhaskar Mukhopadhyay
(74) *Attorney, Agent, or Firm* — K&L Gates LLP

(57) ABSTRACT

An open-ended edible container for foodstuffs is provided. The open-ended container is composed of cereals and/or fruits in a sheet formed of a binder wherein the inner surface of the container is very lightly patterned while the outer surface has a smooth texture with embedded flakes. A process for manufacturing edible containers for foodstuffs is also provided and includes the steps of: pouring a liquid batter on baking plates, partially cooking the batter for providing a sheet, depositing cereals and/or fruit flakes as a layer onto the sheet, cooking the sheet, and giving the desired shape to the container. The inner surface of the container is very lightly patterned while the outer surface of the container has a rough texture with embedded flakes.

7 Claims, 1 Drawing Sheet

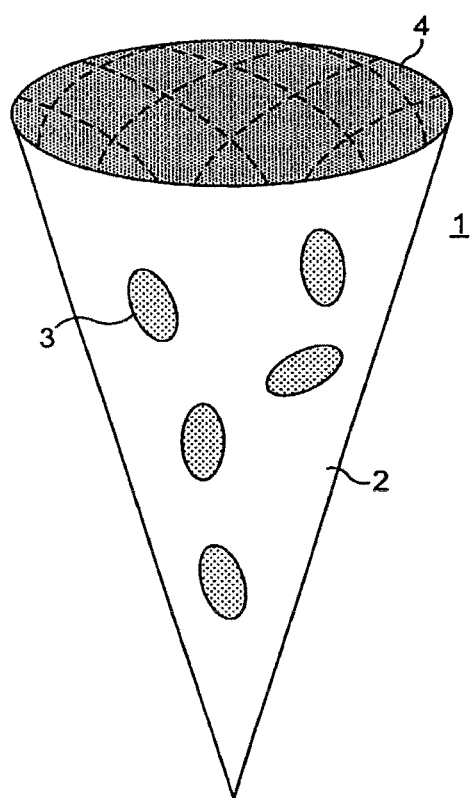

EDIBLE CONTAINER FOR FOODSTUFFS AND PROCESS FOR PRODUCING THE SAME

PRIORITY CLAIM

This application is a continuation of U.S. application Ser. No. 11/720,254, filed May 25, 2007, which is a National Stage of International Application No. PCT/EP2005/010911, filed on Oct. 11, 2005 which claims priority to European Patent Application No. 04028070.3, filed on Nov. 26, 2004 and European Patent Application No. 05102346.3, filed Mar. 23, 2005, the entire contents of which are incorporated herein by reference.

FIELD OF THE INVENTION

The present invention relates to edible containers for foodstuffs and to a process for preparing them.

BACKGROUND

Manufacturing containers is well known in the art. Usually, edible containers are made of wafers from batter recipes. These wafers are generally made by cooking a batter, which is a liquid suspension, by means of an oven or by extrusion.

US 2001/0043970 pertains to edible wafers, in particular sugar wafers, and to a process for preparing them. In fact, the invention provides a sugar wafer batter wherein part of the wheat flour is replaced by cereal grits and/or all or part of the sucrose is replaced by a reducing sugar. In this case, replacing part of the wheat flour in a wafer batter by cereal grits and/or replacing all or part of the sucrose with a reducing sugar, allows the obtention of a sugar wafer that is sufficiently flexible over a longer period of time compared with standard sugar wafers.

Using cereal grits allows a longer crispiness but the visual aspect is not modified and the viscosity of the batter is quite the same as a conventional batter.

There is a need to provide a new kind of edible containers. It is an object of the present invention to provide a container with nutritional features that are improved. It is another object of the present invention to provide a container with an innovative fashion to be more attractive for consumers. It is another object of the invention to provide an edible container with a new texture.

Furthermore, including flakes is not obvious because of their shape. In fact, edible containers obtained by means of cooking a batter lose their crispiness over time by absorbing moisture which softens them. The solution is to coat the inner surface of the container with a fat-based coating, for example chocolate. But this step needs a smooth surface to allow a homogeneous coating. It is an object of the present invention to provide a container, which contains cereal and/or fruit flakes and which can simultaneously be coated.

SUMMARY

The invention relates to an open-ended edible container for foodstuffs composed of cereals and/or fruits in a sheet formed by means of a binder characterized in that the inner surface of the container is very lightly patterned while the outer surface has a smooth texture with embedded flakes.

Moreover, the inner surface is nonporous such that it allows a homogeneous coating for example with a confectionery fat, for example a chocolate, a vegetable fat or compound to form a moisture barrier and thus retaining a desirable crispiness.

Said edible container can be made of cereals, which could be wheat, barley, corn, rice or rye and mixtures thereof. The edible container can also be made by a mixture of cereals and fruits, preferably dry nuts and/or almonds. All these raw materials are further sheet-formed by means of a binder, which is usually a batter. In a preferred embodiment, the container is in the shape of a cone and can be filled with frozen confection for example.

The invention relates also to a process for manufacturing edible containers for foodstuffs. comprising the steps of
 pouring a liquid batter on baking plates,
 partially cooking the batter for providing a sheet,
 depositing cereals and/or fruit flakes as a layer onto the sheet,
 finally cooking the sheet,
 giving the desired shape to the container,
 wherein the inner surface of the container is very lightly patterned while the outer surface of said container has a smooth texture with embedded flakes.

The desired shape can be formed by using a rolling device for example, in this case said rolling device could be a mandrel.

BRIEF DESCRIPTION OF THE FIGURES

FIG. 1 illustrates a perspective view of an edible container in accordance with an embodiment of the present invention.

DETAILED DESCRIPTION

The invention relates to an open-ended edible container for foodstuffs composed of cereals and/or fruits in a sheet formed by means of a binder characterized in that the inner surface of the container is very lightly patterned while the outer surface has a smooth texture with embedded flakes.

The cereals may be grains or seeds, for example, corn, maize, wheat, oat, rice, and the like, or any combination of two or more thereof in the form of flakes The fruits are dried fruits and may be, for example, sliced almond, nuts and mixtures thereof.

In addition, some seeds may be added which procure additional benefits, e.g. in terms of nutrition, for example linseeds or flaxseeds which add omega 3 15 fatty acids in the form of triglycerides.

The edible container can also be made of a mixture of cereals, seeds and dried fruits cited above.

The batter can be made from about 20% to 60% by weight of flour, water, and sucrose (which may be brown or white) together with smaller quantities of one or more ingredients typically used in wafers, such as fat, milk powder, soya flour, salt, lecithin. Optionally, colorings, cocoa powder, flavors, emulsifiers, vanilla crystals, and a raising agent may be added. The flour is usually wheat flour but it may be another flour, such as rice flour or a flour admixed with a starch.

The containers of the present invention typically have a low fat content, normally from 3-5% but which in some cases can be up to 10%. The main function of the fat is as an anti-sticking/releasing agent. Containers can have a sugar content of less than 5% to from about 70%. It depends if the final product has to be sweet or savory.

The cereals and/or fruits are deposited as a layer on a on a partially cooked layer of batter, after that the cooking step allows the evaporation and when the viscosity of the batter increases, it act as a binder and forms a sheet. Said sheet is afterwards rolled to form an open-ended container with a very lightly patterned inner surface and an outer surface which has a smooth texture and comprises embedded cereal flakes and/or sliced fruits, which gives a hand-made aspect to it.

Said cereal flakes are interesting in the present case because of their nutritional properties. Indeed, cereals are mainly composed by fibers, which are known for their ability to control energetic contributions. Then they make it possible to spread out the absorption of the nutrients, and in particular of glucids, this is very interesting for the diabetes problems. And finally, the fibers would decrease the time of contact of potentially harmful products with the colic mucous membrane. So including cereal flakes in the composition of the present edible container allows a higher concentration in fibers in said container.

The invention also pertains to a process for manufacturing edible containers for foodstuffs comprising the steps of pouring a liquid batter on baking plates,
partially cooking the batter for providing a sheet,
depositing cereals and/or fruit flakes as a layer onto the sheet,
finally cooking the sheet,
giving the desired shape to the container, wherein the inner surface of the container is very lightly patterned while the outer surface of said container has a smooth texture with embedded flakes.

Under the phrase "very lightly patterned" it is intended to mean that the network of lines which raise over the inner surface of the container or of grooves which are depressed under the said surface is very light in order to allow for uniformly applying of a protective fat-based coating onto the surface.

The desired shape can be formed by using a rolling device, for example, this device can be a mandrel.

The containers may have a variety of shape and sizes, for examples, they may be cone-shaped, cup-shaped or tubular.

The invention described and claimed herein is not to be limited in scope by the specific embodiment herein disclosed, since this embodiments is intended as illustration of several aspects of the invention. Any equivalent embodiments are intended to be within the scope of this invention. Indeed, various modifications of the invention in addition to those shown and described herein will become apparent to those skilled in the art from the foregoing description. Such modifications are also intended to fall within the scope of the appended claims.

In accordance with the present embodiment each layer when it is still soft and deformable after the baking operation is rolled to form a cone.

The batter is poured on to a baking plate and partially cooked by closing plate for approx 10 seconds. The plate is reopened and cereal and/or fruits flakes are deposited on to the said batter. This mixture is then cooked using, for example, a continuous baking oven. Such ovens have endless baking-tong chains which revolve continuously and have baking tongs each containing a baking mold consisting of two flat baking plates for the production of layers. These baking ovens have a longitudinally extending oven housing, which on the outside has a heat-insulating end closure consisting of doors and plates. In the oven housing a longitudinally extending parallellepipedic inner space is provided, through which extends the endless baking tong chain through two superimposed transport levels and over two guide mechanisms provided respectively at each end of the inner space. The length, widths and height of this inner space depend on the size of the substantially rectangular baking tongs and the length of the baking tong chains. The size of the baking tongs is selected according to the size of the layers to be produced. The width of the inner space is primarily determined by the width of the baking tongs. The length of the baking tongs determines the diameter of the guide mechanisms of the baking tong chain, by determining the vertical distance between the two transport levels, and thereby the height. of the inner space.

In the upper transport level of the baking oven, a discharge or removal station wherein the baked layers are removed from the opened baking molds, a pouring station, wherein the flowable batter is poured, into the opened baking molds, followed by closing and reopening of the baking mold, wherein the cereal and/or fruits are deposited on to the partially cooked batter, followed by a final closing of the mold, is arranged in succession in the travel direction of the baking tong chain. In the travel direction of the baking tong chain, the pouring station is followed by a long baking space, which ends shortly before the removal station and which contains the baking tong chain segment located in the lower transport level. The baking tong chain revolves at a constant speed and transports the closed baking tongs through the longitudinally extending baking space provided with gas burners. After leaving the baking space, the baking tongs are released for the opening of the baking molds and are again clamped together after passing through the pouring station thereby closing the baking molds.

During one revolution of a baking tong, at the pouring station a precisely measured amount of flowable batter is poured onto the lower baking plate of an open baking mold. After the pouring station, the baking mold is closed by clamping together the baking tongs. After a predetermined time the baking tongs are reopened thereby allowing depostion of cereal and/or fruit on to the partially cooked batter. After this stage the tongs are closed for the full baking. While the closed baking tongs travel through the baking space, from the dough portion a cake is formed inside, which is plastically deformable while warm. Before reaching the discharge station, the baking mold is opened by releasing the baking tongs. At the discharge station the cake is removed from the opened baking mold and transferred to the cone-making machine in a plastically deformable state, while the baking tong is transported further to the dough-pouring machine for the production of the next cake. The travel time of the baking tongs from the dough-pouring station through the baking space to the discharge station corresponds to the predetermined baking time of the cake.

The production capacity of the baking oven depends mainly on the number of baking plates which are transported by the baking tongs chain at a constant speed during the predetermined baking time from the dough-pouring station through the baking space to the discharge station. The running speed of the baking tongs chain is selected so that each baking tong will complete its travel from the dough-pouring station through the baking space to the discharge station within the predetermined baking time.

In order to increase the production capacity of the baking oven it is possible to lengthen the baking tongs chain by a few baking tongs and to increase the running speed of the baking tongs chain, so that each baking tongs will complete the lengthened travel path in the predetermined baking time of the cakes.

These longitudinally extending baking ovens are combined with forming machines, wherein a rigid rotary frame revolving around a stationary rotation axis comprises roll-up mechanisms assigned to the baking molds of the baking oven, which are transported by the rotary frame in a closed circuit from a loading station through a work path to a discharge station, while the plastically deformable layers pulled in by them at the loading station are formed, rolled up into cones for example, and the cones are allowed to cool in order to increase the stability of their shape.

Between the baking oven and the cone-making machine a transfer device is provided, which transports the plastically deformable layers from the very hot baking molds of the baking oven to the considerably cooler roll-up mechanisms of the cone-making machine and whose work pace is synchronized with that of the baking oven and of the cone-making machine.

The transfer device has a rotary star frame rotating about a vertical axis, which at the end of its star-shaped work arms has small stamps by means of which it seizes the layers at their upper side and pulls them on an arched horizontal slide from the discharge station of the baking oven to the loading station of the cone-making machine. Each stamp is applied with minimal pressure to the upper side of the cake which are easily deformable in their plastically deformable state, in order to keep at a minimum the friction between the layer and the slide, in order to avoid deformation of the layer during transport.

In order to insure the plastic deformability of the cones arriving at the roll-up mechanisms, the cooling of the cakes occurring during their passage through the transfer device, and the therewith necessarily connected reduction of their plastic deformability, cannot surpass a certain limit.

During the rolling operation the edges of the layer disc move freely without any restraint. When a rolled cone has been formed, that cone is shortened to a predetermined length by subjecting the edge portions of the cone at its large end and, if desired, also at its small end, to a plastic deformation so that any irregularities which have resulted from the rolling operation will be eliminated and the cone will be given an exactly defined length. Thereafter the cone is permitted to harden.

The edible container of the present invention may be used in a variety of confectionery products together with confectionery materials such as ice creams, chocolates, or other fatty materials such as fat-based creams. The edible container may be filled with confectionery materials, preferably of low water activity so that a minimum of moisture migration occurs. For example the confectionery material may be ice cream, or fat-based creams containing yogurt.

If the water activity of the filling is so to high, some moisture will pass into the container and thus said container will lose its crispiness. To avoid this phenomenon, in case of a high moisture content filling, the edible container has to be coated with a fat-based coating such as chocolate, vegetable fat or compound coating for example. The method to coat the container can be all method known. For example, it can be coated by using a feed hopper behind the rolling and cooling structure, so as to pour the coating into the container or by spraying or showering.

The invention is further defined by reference to the following example describing in detail the preparation of the edible containers of the present invention. In the example parts and percentages are by weight unless specified otherwise.

EXAMPLES

Example 1

A liquid batter is prepared which has the following composition:

| | |
|---|---|
| Water | 51.85 |
| Sucrose | 16.00 |
| Coconut fat | 3.60 |
| Lecithin | 1.00 |
| Wheat Flour | 27.00 |
| Salt | 0.14 |
| Flavouring | 0.16 |
| | 100.00 |

Using a continuous in line type baking oven with gas heating provided with baking plates, 14 g of batter is dosed on a plate, the plate is closed in order to allow partial cooking of the batter in a sheet, then opened after 10 s and a suitable quantity of skinless sliced almond 4-8 mm sliced is deposited so as to produce 11 g wafer to 2 g sliced almonds in the cooked wafer.

The baking plates are to have a smooth surface on the upper plate and a fine pattern on the lower plate. The smooth surface on the upper plate helps to make the sliced almond visible on the outer surface of the container. The fine pattern on the lower plate serves to hold the batter in place during the initial stage of cooking where it is still liquid. The fine pattern which results on the inner surface of the container is such that a fat-based coating can be uniformly applied on the whole surface. After almond dosage the plate is closed and the cake sheet is finally baked. The running speed of the machine is 2400 plates per hour. The baking process is approx 1.1 minutes per plate. Temperature in the oven is 175-205° C. and preferably 185° C. When the cake is baked the plate is opened and the cake is transferred to a rolling device.

The cone-rolling device is configured to roll the cone with the upper surface from the plate rolled to the outside of the cone. After forming the cone shaped cake is refrigerated and paked into a sleeve.

Finally it is coated on the inside with a plain chocolate layer which serves as moisture barrier, filled with vanilla ice cream and topped with chocolate chips.

In FIG. 1 of the enclosed drawing a cone-shaped container made according to the invention is schematically represented before being coated and filled.

It comprises a rolled sugar wafer 1 which has an exterior surface 2 that is smooth and has adjuncts of sliced almonds 3 embedded in it. In place of almonds flaked cereals, nuts or seeds may be embedded instead. Its internal surface 4 is very lightly patterned and perfectly suited for being uniformly coated with chocolate as moisture barrier.

Example 2

The process of example 1 is carried out except that 14 g of batter is dosed on a plate, the plate remains open in order to allow partial cooking of the batter in a sheet on its lower surface, and after 10 s a suitable quantity of skinless sliced almond 4-8 mm sliced is deposited on the upper surface of the batter sheet so as to produce 11 g wafer to 2 g sliced almonds in the cooked wafer.

Example 3

The process of example 2 is carried out except that 2 g whole flaxseeds is deposited on the upper surface of the batter sheet.

The invention is claimed as follows:

1. A process comprising:
pouring a liquid batter into a baking mold;
partially cooking the liquid batter with the baking mold in a closed position to form a single layer sheet of partially cooked batter;
opening the baking mold after forming the sheet of partially cooked batter;
depositing on the sheet of partially cooked batter an ingredient selected from the group consisting of cereals, fruit flakes and combinations thereof;
closing the baking mold after depositing the ingredient;
fully cooking the sheet of partially cooked batter on which the ingredient is deposited, and a pattern on a lower plate of the baking mold forms a network of lines on a bottom surface of the sheet;
transporting the baking mold through a continuous baking oven during the partial cooking and the fully cooking, and the ingredient is deposited on the sheet while the baking mold is in the continuous baking oven; and
providing a desired shape to the sheet, after the fully cooking, to form an edible container comprising an inner surface and an outer surface, and the network of lines raise over the inner surface of the edible container.

2. The process of claim 1 comprising:
rolling the sheet into a cone, after the fully cooking, to form the edible container.

3. The process of claim 1 comprising:
applying a fat-based coating to the inner surface of the edible container by an operation selection from the group consisting of spraying and showering.

4. The process of claim 1, wherein the outer surface of the container has a smooth texture with embedded flakes of the ingredient.

5. The process of claim 1, wherein the baking mold comprises a flat upper baking plate.

6. The process of claim 1, wherein the partially baking and the fully baking are performed at a temperature from 175 to 205° C.

7. The process of claim 1, wherein the partially baking is performed for 10 seconds.

* * * * *